United States Patent
Tanaka

(10) Patent No.: US 11,507,332 B2
(45) Date of Patent: Nov. 22, 2022

(54) INFORMATION PROCESSING APPARATUS WITH SETTING OF NETWORK AND NON-TRANSITORY COMPUTER READABLE MEDIUM STORING PROGRAM FOR EXECUTING INFORMATION PROCESSING APPARATUS WITH SETTING OF NETWORK

(71) Applicant: FUJIFILM Business Innovation Corp., Tokyo (JP)

(72) Inventor: Tatsuyuki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 545 days.

(21) Appl. No.: 16/517,668

(22) Filed: Jul. 22, 2019

(65) Prior Publication Data

US 2020/0293245 A1    Sep. 17, 2020

(30) Foreign Application Priority Data

Mar. 12, 2019    (JP) .............................. JP2019-044989

(51) Int. Cl.
*G06F 15/00* (2006.01)
*G06F 3/12* (2006.01)
*G06K 1/00* (2006.01)

(52) U.S. Cl.
CPC .......... *G06F 3/1236* (2013.01); *G06F 3/1209* (2013.01); *G06F 3/1292* (2013.01); *G06F 3/1293* (2013.01)

(58) Field of Classification Search
CPC .... G06F 3/1236; G06F 3/1209; G06F 3/1292; G06F 3/1293

USPC ............................ 358/1.15, 1.14, 1.13, 1.1
See application file for complete search history.

(56) References Cited

U.S. PATENT DOCUMENTS

| | | | |
|---|---|---|---|
| 9,372,646 B2* | 6/2016 | Konishi | H04W 4/026 |
| 2008/0137125 A1* | 6/2008 | Naitoh | G06F 3/123 |
| | | | 358/1.14 |
| 2015/0109636 A1* | 4/2015 | Tanaka | H04N 1/00344 |
| | | | 358/1.15 |
| 2015/0264198 A1 | 9/2015 | Kamiya | |
| 2020/0153788 A1* | 5/2020 | Tanaka | H04L 61/5014 |

FOREIGN PATENT DOCUMENTS

JP    2015176235    10/2015

* cited by examiner

*Primary Examiner* — Douglas Q Tran
(74) *Attorney, Agent, or Firm* — JCIPRNET

(57) ABSTRACT

An information processing apparatus includes a first acquisition unit that acquires setting information for performing a setting of a network of the apparatus, and first environment information of the network from an external management apparatus, through a communication line; a setting unit that performs the setting of the network using the setting information acquired by the first acquisition unit; a second acquisition unit that acquires second environment information of the network after execution of the setting by the setting unit; and a notification unit that notifies that the network to which the apparatus is connected is incorrect, in a case where the first environment information and the second environment information do not match.

18 Claims, 19 Drawing Sheets

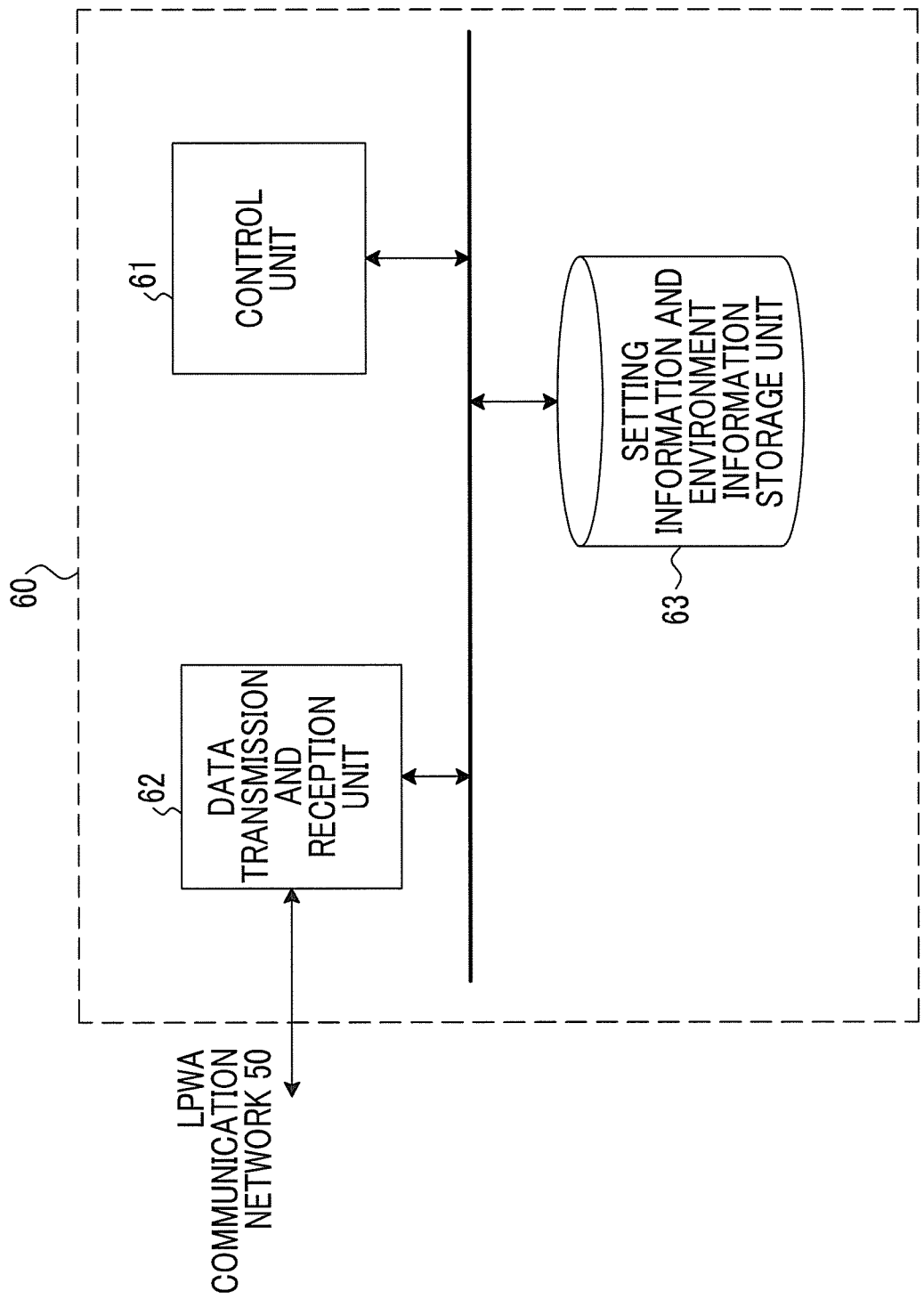

FIG. 7

| IDENTIFICATION INFORMATION | SETTING INFORMATION | NETWORK ENVIRONMENT INFORMATION |
|---|---|---|
| MFP111111 | SETTING INFORMATION 1 OF IP COMMUNICATION (IP ADDRESS, SUBNET MASK, GATEWAY ADDRESS) | AUTHENTICATION SERVER ADDRES (192.23.10.221) MAIL SERVER ADDRESS (192.23.10.100) |
| | SETTING INFORMATION 2 OF IP COMMUNICATION (IP ADDRESS, SUBNET MASK, GATEWAY ADDRESS) | AUTHENTICATION SERVER ADDRES (192.25.10.221) MAIL SERVER ADDRESS (192.25.10.100) |
| MFP222222 | SETTING INFORMATION 3 OF IP COMMUNICATION (IP ADDRESS, SUBNET MASK, GATEWAY ADDRESS) | AUTHENTICATION SERVER ADDRES (192.27.10.221) MAIL SERVER ADDRESS (192.27.10.100) |

FIG. 16
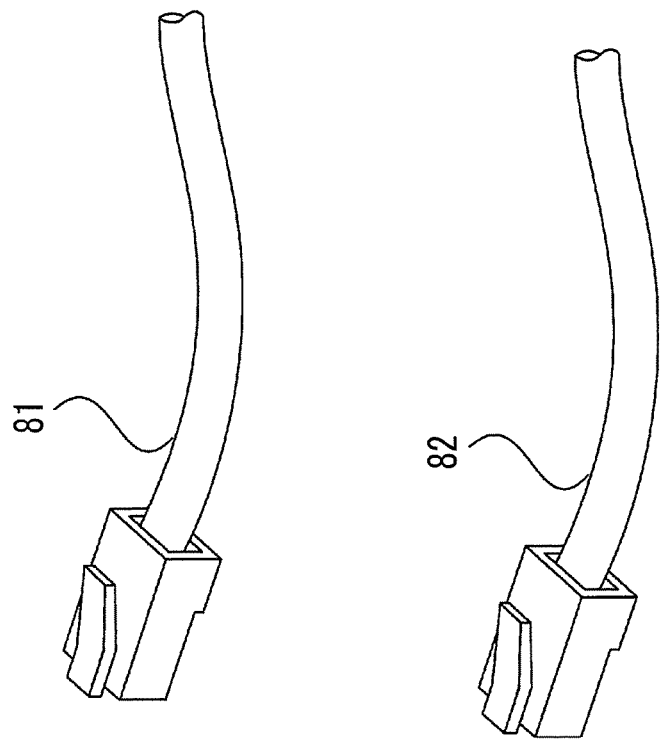
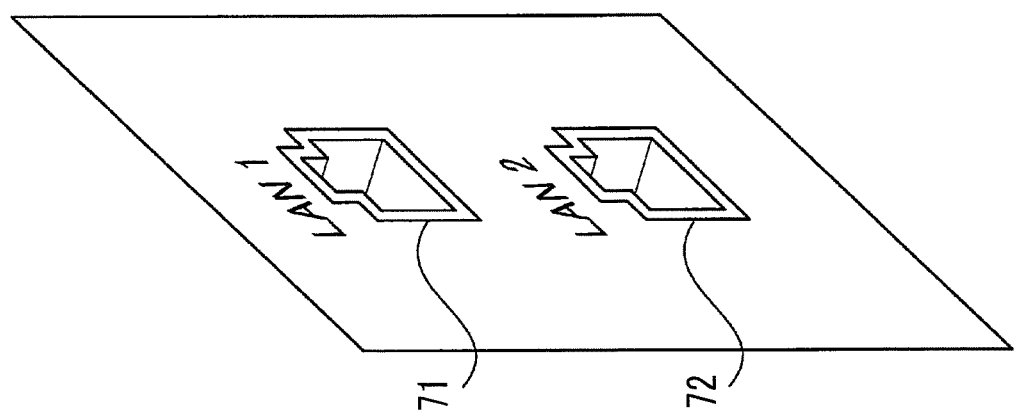

INFORMATION PROCESSING APPARATUS WITH SETTING OF NETWORK AND NON-TRANSITORY COMPUTER READABLE MEDIUM STORING PROGRAM FOR EXECUTING INFORMATION PROCESSING APPARATUS WITH SETTING OF NETWORK

CROSS-REFERENCE TO RELATED APPLICATIONS

This application is based on and claims priority under 35 USC 119 from Japanese Patent Application No. 2019-044989 filed Mar. 12, 2019.

BACKGROUND

(i) Technical Field

The present invention relates to an information processing apparatus, and a non-transitory computer readable medium storing a program.

(ii) Related Art

JP2015-176235A discloses an automatic installation method which is intended to automate the setup of an image forming apparatus by associating, in advance, a setting value needed to be set individually for each image forming apparatus with individual data to be set and the image forming apparatus to be set.

SUMMARY

Aspects of non-limiting embodiments of the present disclosure relate to an information processing apparatus, and a non-transitory computer readable medium storing a program, capable of notifying the user that the apparatus is connected to a wrong network, in a case where the apparatus is connected to a network different from a network of which setting is performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first acquisition unit that acquires setting information for performing a setting of a network of the apparatus, and first environment information of the network from an external management apparatus, through a communication line; a setting unit that performs the setting of the network using the setting information acquired by the first acquisition unit; a second acquisition unit that acquires second environment information of the network after execution of the setting by the setting unit; and a notification unit that notifies that the network to which the apparatus is connected is incorrect, in a case where the first environment information and the second environment information do not match.

BRIEF DESCRIPTION OF THE DRAWINGS

Exemplary embodiment(s) of the present invention will be described in detail based on the following figures, wherein:

FIG. 6 is a block diagram illustrating a functional configuration of the management server 60 according to the exemplary embodiment of the present invention;

FIG. 7 is a diagram showing an example of setting information and environment information stored in a setting information and environment information storage unit 63;

FIG. 16 is a diagram for explaining a state in which there are two wiring cables 81, 82 for two connection terminals 71, 72;

DETAILED DESCRIPTION

Figure 1:
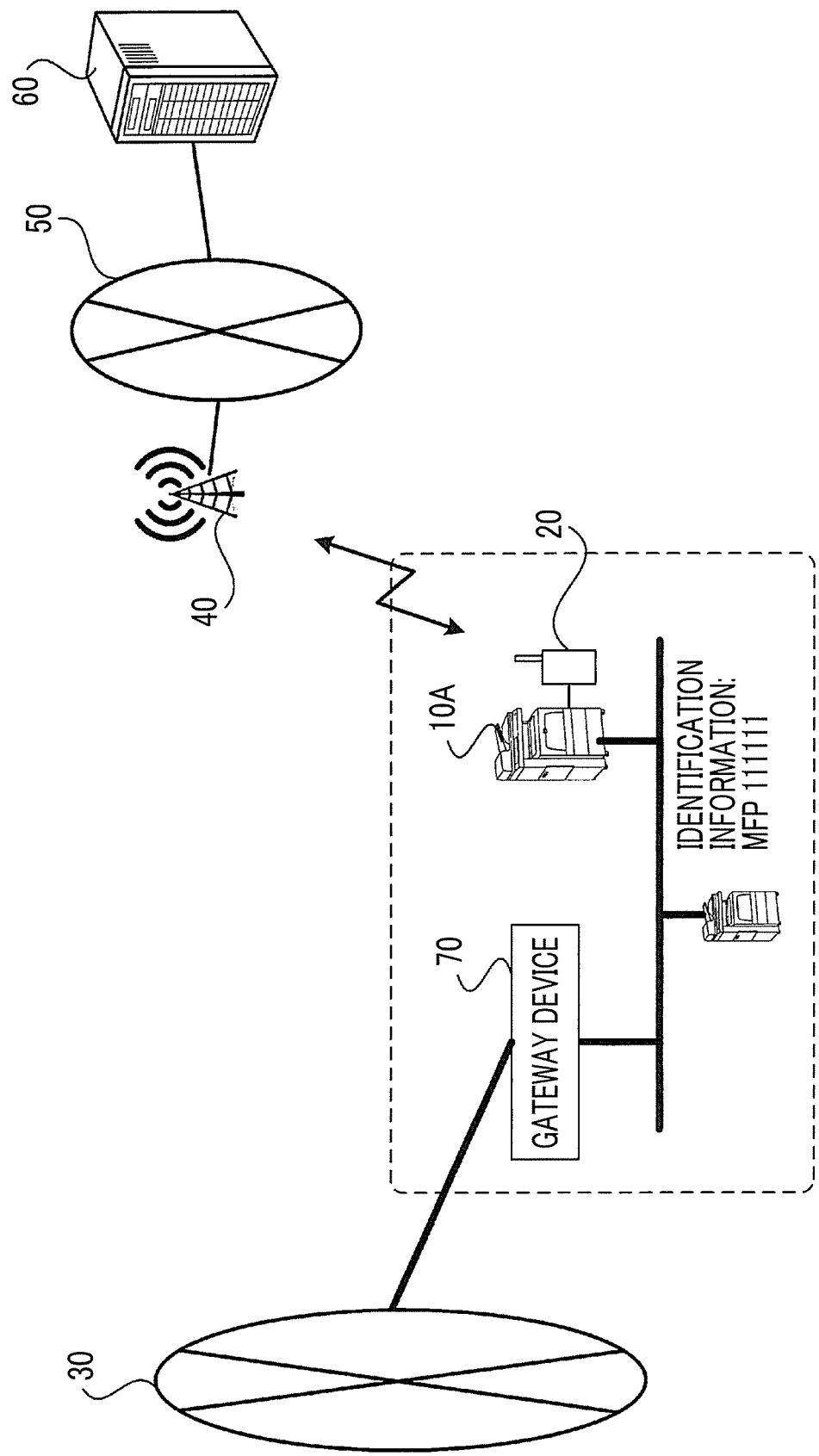
FIG. 1 is a diagram illustrating a system configuration of an information processing system according to an exemplary embodiment of the present invention.

Hereinafter, an exemplary embodiment of the present invention will be described in detail with reference to the accompanying drawings.

An information processing system according to the present exemplary embodiment has a configuration in which an image forming apparatus 10A and a management server 60 are connected through a low power wide area (LPWA) communication module 20, a base station 40, and an LPWA communication network 50.

A company network such as a local area network (LAN) to which the image forming apparatus 10A is connected to the Internet 30 by a gateway device 70.

Identification information is given to the image forming apparatus in the present exemplary embodiment, and identification information "MFP 111111" is given to the image forming apparatus 10A shown in FIG. 1.

Here, identification information of the image forming apparatus used in the present exemplary embodiment is not information for uniquely specifying the apparatus, but is information for specifying an apparatus for which a setting of a certain network is desired to be performed. That is, in a case where it is desired to replace the apparatus for which the setting of a certain network is performed with another apparatus and perform the same network setting, the same identification information is given to the apparatus after the replacement.

Figure 2:
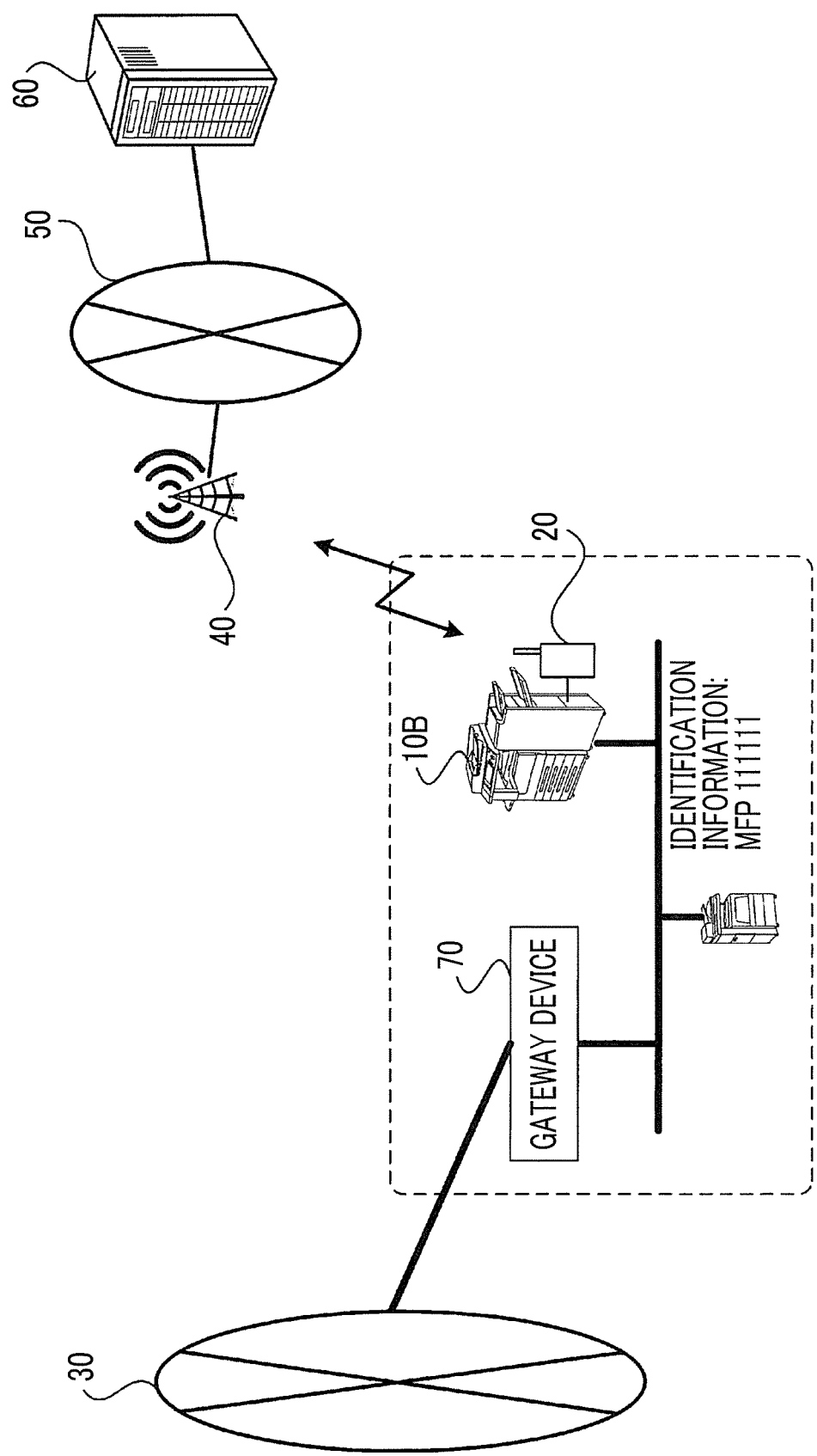
FIG. 2 is a diagram for explaining a state in a case where an image forming apparatus 10A is replaced with an image forming apparatus 10B in FIG. 1.

For example, as shown in FIG. 2, in a case where the image forming apparatus 10A is replaced with the image forming apparatus 10B, in a case where the setting of the network of the image forming apparatus 10B is desired to be the same as the image forming apparatus 10A, the same identification is also given to the image forming apparatus 10B.

Here, the network setting includes enabling connection to a network such as the Internet by setting an Internet protocol (IP) address, a subnet mask, a gateway address, or the like, or enabling connection to a network by correctly wiring a LAN cable or the like.

Then, the management server 60 stores setting information for performing a setting of the network of the image forming apparatus 10 and environment information of the network in association with identification information. The details of the management server 60 will be described later.

Here, the environment information of the network is information for verifying whether or not the network setting has been performed correctly, and for example, the address information of the authentication server or the address information of the mail server can be used.

Then, in the information processing system according to the present exemplary embodiment, it is checked whether or not a network setting identical to the network setting of the image forming apparatus 10A before replacement is performed for the image forming apparatus 10B after replacement, by checking whether or not pieces of the environment information before and after replacement match each other.

The image forming apparatus 10B after the replacement can connect to the Internet 30 in a state where the setting of the network is performed. That is, the image forming apparatus 10B after the replacement cannot connect to the Internet 30 in the state where the setting of the network is not performed.

Therefore, immediately after performing replacement with the image forming apparatus 10B, even in a case where the setting information for performing a setting of the network is stored in the management server 60, in a case where the management server 60 is accessed only through the Internet 30, the setting information cannot be acquired at all.

Further, in recent years, a network in which an image forming apparatus is installed is blocked from the Internet or a firewall is provided on the way, so there may be a case where connection with the management server 60 cannot be made.

In such a case, immediately after replacing the image forming apparatus 10A with the image forming apparatus 10B as shown in FIG. 2, first, it is necessary to perform various settings of the network by the operation of the user and to make a state where connection to the Internet 30 is possible.

Therefore, in the information processing system according to the present exemplary embodiment, the image forming apparatus 10B is connected to the management server 60 through the LPWA which is a power saving wide area wireless communication line to acquire setting information for performing a setting of the network.

The LPWA is also called a low power wide area network (LPWAN), and is a wireless communication line in which high-speed communication cannot be performed but data can be transmitted and received in a wide area with low power consumption.

The LPWA is a wireless communication line in which communication with the management server 60 can be performed without the need for network connection settings. The LPWA is a wireless communication line in a wide area wireless communication network in which data transmission and reception is performed at a lower communication speed than the communication speed in the Internet 30 which is an external network.

In recent years, commercial services of the LPWA wireless communication line have been provided, and it can be used at a lower communication charge than the line contract of the mobile telephone line network.

Then, after acquiring setting information corresponding to the identification information through the LPWA communication network 50 and performing a setting of the network, the image forming apparatus 10B acquires environment information of the network to which the host apparatus is connected, and checks whether the correct network setting has been performed by determining whether or not the acquired environment information and the environment information received from the management server 60 corresponding to the identification information.

Figure 3:
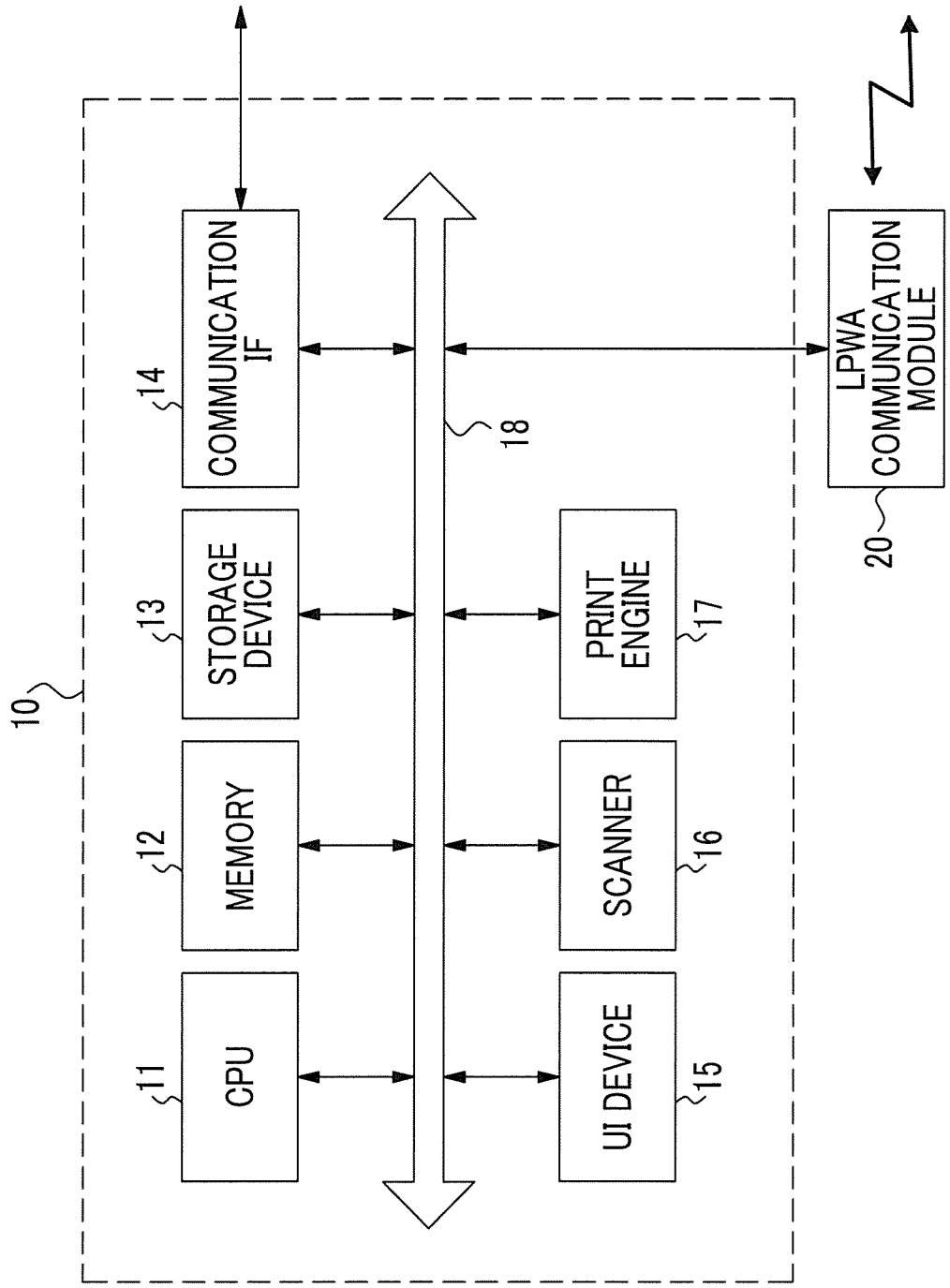
FIG. 3 is a block diagram illustrating a hardware configuration of an image forming apparatus 10 according to the exemplary embodiment of the present invention.

Next, the hardware configurations of the image forming apparatuses 10A, 10B shown in FIG. 1 and FIG. 2 are shown in a block diagram of FIG. 3.

The basic configurations of the image forming apparatuses 10A, 10B are identical to each other, so the image forming apparatuses 10A, 10B are simply expressed as the image forming apparatus 10 in the case of expressing without distinction, in the following descriptions.

As shown in FIG. 3, the image forming apparatus 10 includes a CPU 11, a memory 12, a storage device 13 such as a hard disk drive (abbreviated as HDD), a communication interface (abbreviated as IF) 14 that transmits and receives data to and from an image forming apparatus 10 or the like through the network 30, a user interface (abbreviated as UI) device 15 including a touch panel or a liquid crystal display and a keyboard, a scanner 16, and a print engine 17. These components are connected to each other through a control bus 18. The LPWA communication module 20 is also connected to the above-described components through the control bus 18.

The CPU 11 executes a predetermined process based on a control program stored in the memory 12 or the storage device 13 to control the operation of the image forming apparatus 10. In the present exemplary embodiment, it is described that the CPU 11 reads and executes the control program stored in the memory 12 or the storage device 13, but it is also possible to provide the program to the CPU 11 by being stored in a storage medium such as a CD-ROM.

Figure 4:
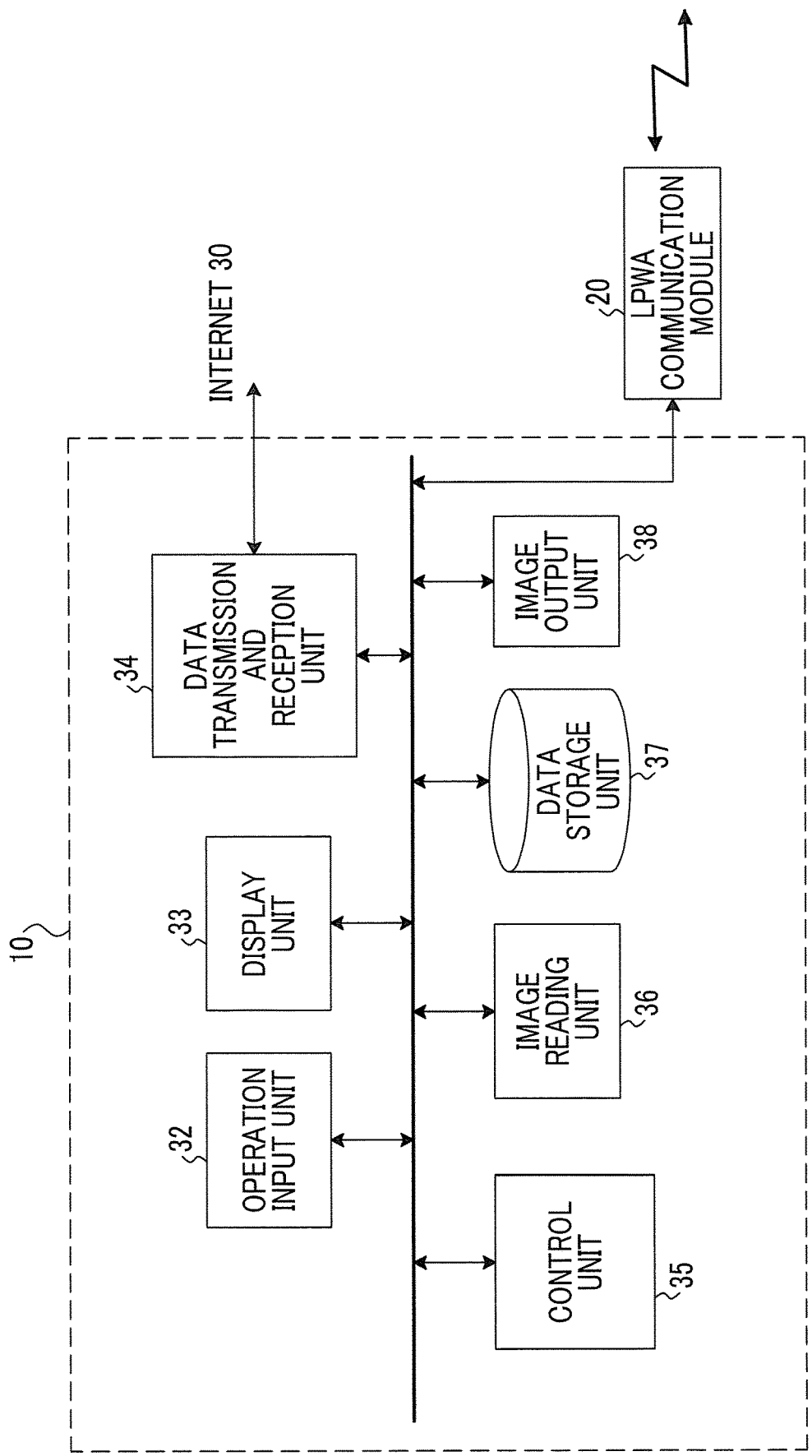
FIG. 4 is a block diagram illustrating a functional configuration of the image forming apparatus 10 according to the exemplary embodiment of the present invention.

FIG. 4 is a block diagram illustrating a functional configuration of the image forming apparatus 10 realized by executing the control program.

As shown in FIG. 4, the image forming apparatus 10 according to the present exemplary embodiment includes an operation input unit 32, a display unit 33, a data transmission and reception unit 34, a control unit 35, an image reading unit 36, a data storage unit 37, and an image output unit 38.

The operation input unit 32 receives various operations by the user. The display unit 33 displays various types of information to the user.

The image reading unit 36 reads an image from the set document. The image output unit 38 outputs an image on a recording medium such as printing paper.

The data transmission and reception unit 34 transmits and receives data to and from an external device through the Internet 30.

The data storage unit 37 stores various data such as print data to be output from the image output unit 38.

The control unit 35 controls the image reading unit 36, the image output unit 38, the display unit 33, and the like, based on the operation accepted by the operation input unit 32, and controls various operations such as a printing operation and a scanning operation.

In a case where a normal setting of the network before the replacement of the apparatus is performed, the control unit 35 acquires environment information of the current network connected to the host apparatus, and transmits the acquired environment information to the management server 60 through the LPWA communication module 20 as environment information of the case where a correct network setting is performed.

Then, the control unit 35 transmits the input identification information to the management server 60 through the LPWA communication module 20, in a case where the replacement of the host apparatus is performed, and the identification information is input through the operation input unit 32. Then, the control unit 35 acquires setting information for performing a setting of the network of the host apparatus and environment information of the network from the management server 60 through the LPWA communication network 50. That is, the control unit 35 acquires setting information and environment information corresponding to the input identification information from the management server 60. Then, the control unit 35 performs a setting of a network using the acquired setting information.

Here, in a case where the image forming apparatus is replaced, the identical identification information to the identification information input to the image forming apparatus 10A before replacement is also input to the image forming apparatus 10B after replacement.

Further, after executing the setting of the network, the control unit 35 acquires the environment information of the set network. Finally, the control unit 35 compares the environment information acquired from the management server 60 with the environment information acquired from the set network, and reports that the network to which the host apparatus is connected is wrong, in a case where the two pieces of environment information do not match each other.

Figure 5:
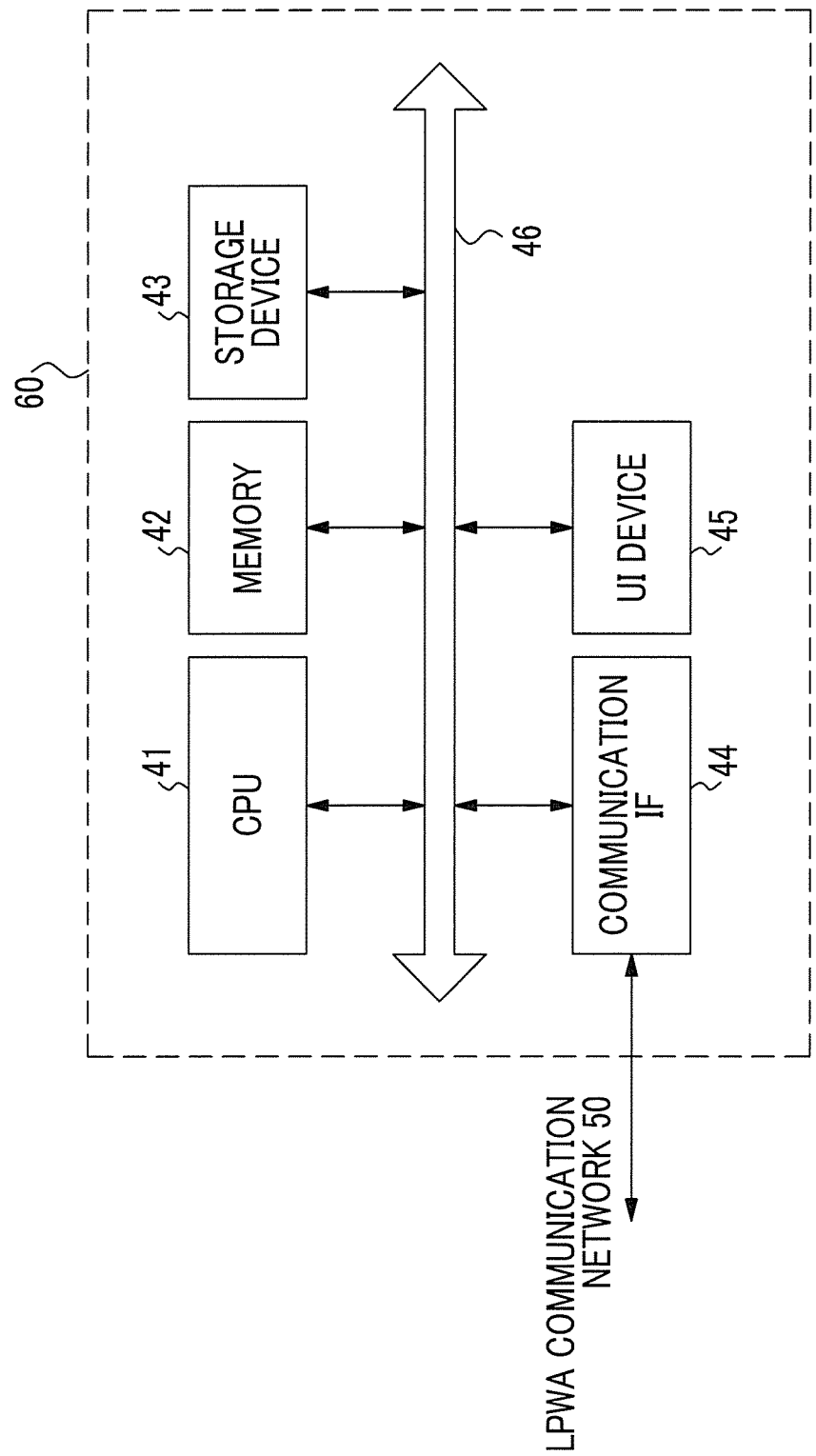
FIG. 5 is a block diagram illustrating a hardware configuration of a management server 60 according to the exemplary embodiment of the present invention.

Next, the hardware configuration of the management server 60 shown in FIG. 1 is shown in FIG. 5.

As shown in FIG. 5, the management server 60 includes a CPU 41, a memory 42, a storage device 43 such as a hard disk drive (abbreviated as HDD), a communication interface (abbreviated as IF) 44 that transmits and receives data to and from the image forming apparatus 10 through the LPWA communication network 50, and a user interface (abbreviated as UI) device 45 including a touch panel or a liquid crystal display and a keyboard. These components are connected to each other through a control bus 46.

The CPU 41 executes a predetermined process based on a control program stored in the memory 42 or the storage device 43 to control the operation of the management server 60. In the present exemplary embodiment, it is described that the CPU 41 reads and executes the control program stored in the memory 42 or the storage device 43, but it is also possible to provide the program to the CPU 41 by being stored in a storage medium such as a CD-ROM.

FIG. 6 is a block diagram illustrating a functional configuration of the management server 60 realized by executing the control program.

As illustrated in FIG. 6, the management server 60 includes a control unit 61, a data transmission and reception unit 62, and a setting information and environment information storage unit 63.

The setting information and environment information storage unit 63 stores setting information for performing a setting of the network of the image forming apparatus 10 and environment information of the network to which the image forming apparatus 10 is connected in association with identification information.

An example of setting information and environment information stored in the setting information and environment information storage unit 63 is shown in FIG. 7.

In FIG. 7, it can be seen that setting information and network environment information are set for each of the identification information "MFP111111" and "MFP222222".

Here, in FIG. 7, setting information 1 of IP communication is associated with identification information "MFP111111", and two pieces of setting information 2, 3 of IP communication are associated with identification information "MFP222222". As the setting information 1 to 3 of IP communication, information such as different IP addresses, subnet masks, and gateway addresses are stored.

Further, in FIG. 7, environment information configured with an authentication server address and a mail server address is stored in association with setting information for each of identification information "MFP111111" and "MFP222222".

In a case where identification information transmitted from image forming apparatus 10 through the LPWA communication network 50 is received by the data transmission and reception unit 62, the control unit 61 reads out the setting information and environment information corresponding to the received identification information from the setting information and environment information storage unit 63. Then, the control unit 61 transmits the read setting information and environment information from the data transmission and reception unit 62 to the image forming apparatus 10 that has transmitted the identification information through the LPWA communication network 50.

In a case where the environment information in a case where the correct network setting is performed is transmitted together with the identification information from the image forming apparatus 10, the control unit 61 updates the environment information stored in the setting information and environment information storage unit 63 with the transmitted environment information.

Next, the operation of the image forming apparatus 10 according to the present exemplary embodiment will be described in detail with reference to the drawings.

Figure 8:
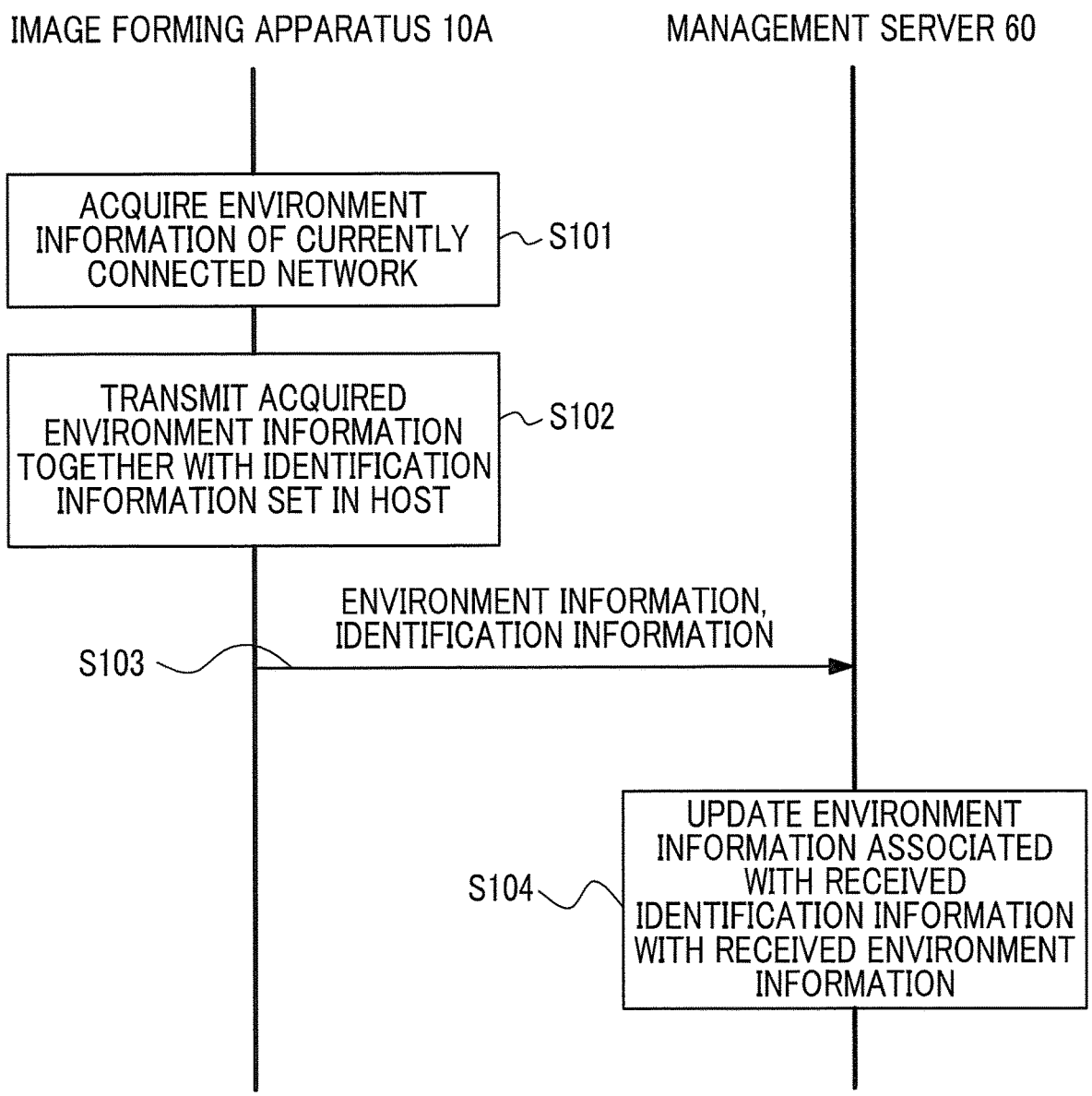
FIG. 8 is a sequence chart for explaining an operation performed before replacement of the image forming apparatus 10.

First, an operation performed before replacement of the image forming apparatus 10 will be described with reference to the sequence chart of FIG. 8.

In a case where an instruction to acquire environment information is issued in the image forming apparatus 10A in a state where a normal setting of the network has been performed, the image forming apparatus 10A acquires, in step S101, information such as the authentication server address and the mail server address of the currently connected network, as environmental information.

Then, in step S102, the image forming apparatus 10A transmits the acquired environment information together with the identification information set in the host apparatus to the management server 60 through the LPWA communication network 50.

Then, in step S103, the environment information and the identification information are transmitted from the image forming apparatus 10A to the management server 60.

Then, in step S104, the management server 60 that has received the environment information and the identification information from the image forming apparatus 10A updates the environment information associated with the received identification information with the received environment information.

Thus, the environment information of the network operating normally before the replacement of the apparatus is acquired and stored in the setting information and environment information storage unit 63 of the management server 60 in association with the identification information.

Next, an operation immediately after the image forming apparatus 10A is replaced with the image forming apparatus 10B will be described with reference to the sequence chart of FIG. 9.

Figure 9:
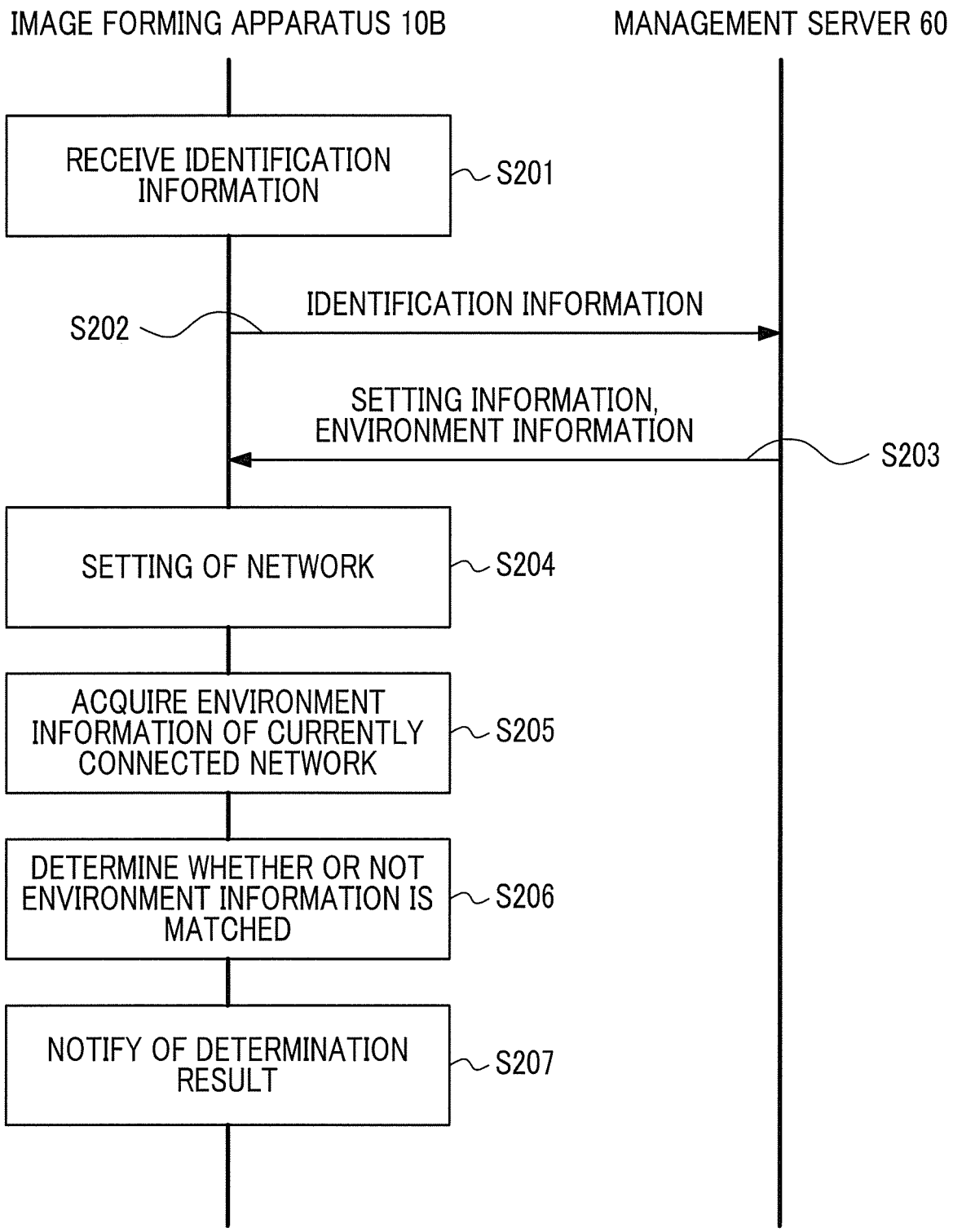
FIG. 9 is a sequence chart for explaining an operation immediately after the image forming apparatus 10A is replaced with the image forming apparatus 10B.

The sequence chart shown in FIG. 9 is for explaining the case where the image forming apparatus 10B performs the matching determination of two pieces of environment information as described above.

First, as shown in step S201, the image forming apparatus 10B receives identification information by user operation. Then, in step S202, the image forming apparatus 10B transmits the received identification information to the management server 60 through the LPWA communication network 50.

In step S203, the management server 60 that has received the identification information from the image forming apparatus 10B transmits, to the image forming apparatus 10B, the setting information and environment information stored in association with the received identification information.

Then, in step S204, the image forming apparatus 10B performs a setting of a network using the setting information received from the management server 60. Then, in step S205, the image forming apparatus 10B acquires environment information of the currently connected network. Then, in step S206, the image forming apparatus 10B determines whether or not the environment information acquired in step S205 matches the environment information transmitted from the management server 60 in step S203.

Then, in step S207, the image forming apparatus 10B notifies the user of the determination result.

Figure 10:
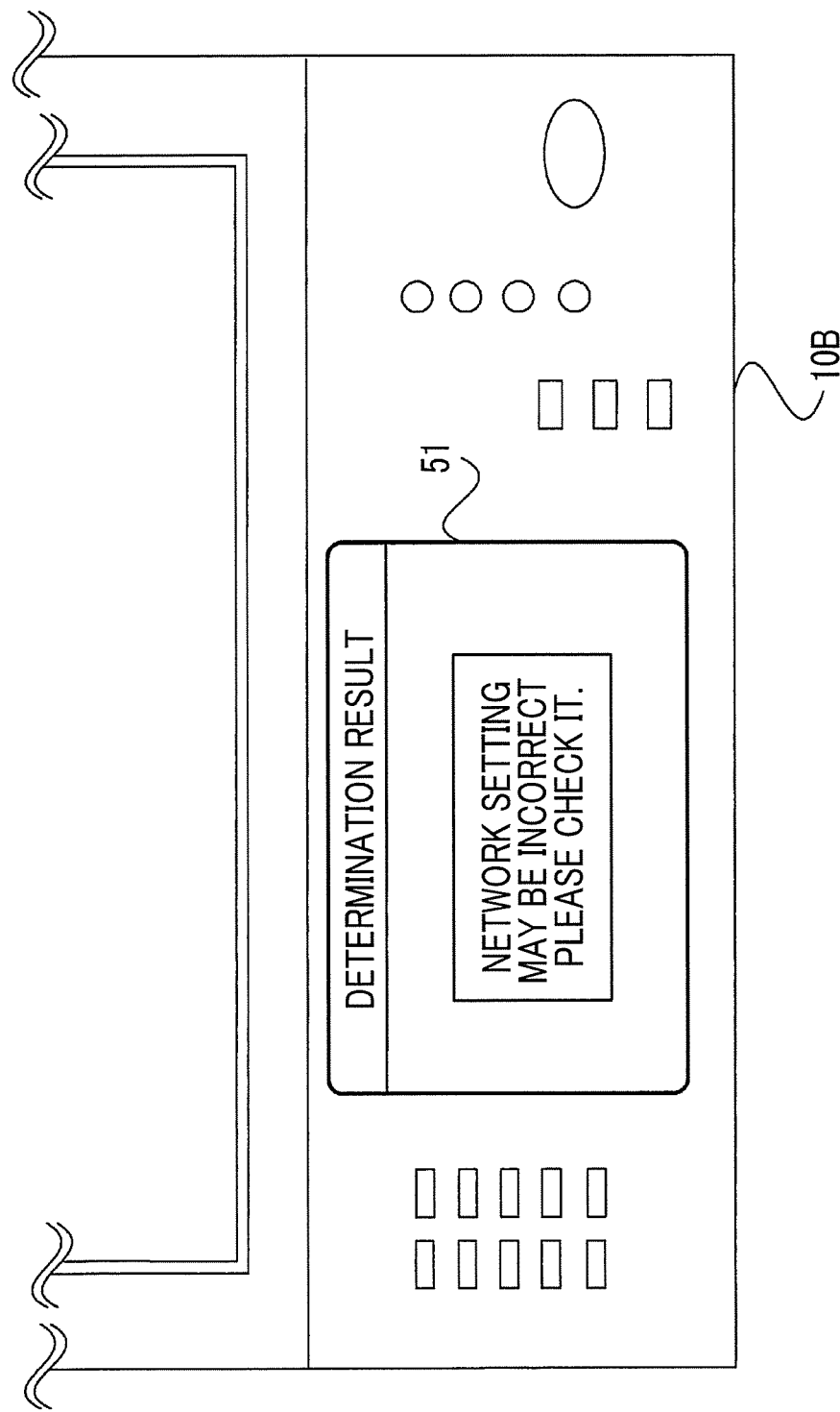
FIG. 10 is a diagram showing a notification example in a case where two pieces of environment information do not match in an environment information matching determination.

A notification example in a case where two pieces of environment information do not match in an environment information matching determination is shown in FIG. 10. In the notification example shown in FIG. 10, a message "The network settings may be incorrect. Please check it." is displayed on the operation panel 51 of the image forming apparatus 10B, and the user is notified that there is something wrong with the network settings.

In the sequence chart shown in FIG. 9, the environment information matching determination is performed on the image forming apparatus 10B side, but the environment information matching determination may be performed on the management server 60 side.

In this case, the control unit 35 of the image forming apparatus 10B transmits the environment information acquired after setting of the network to the management server 60 through the LPWA communication network 50.

Then, the control unit 61 of the management server 60 determines whether or not the environment information transmitted from the image forming apparatus 10B matches the environment information stored in the setting information and environment information storage unit 63, and notifies that the network to which the image forming apparatus 10B is connected is erroneous, in a case where the two pieces of environment information do not match.

Figure 11:
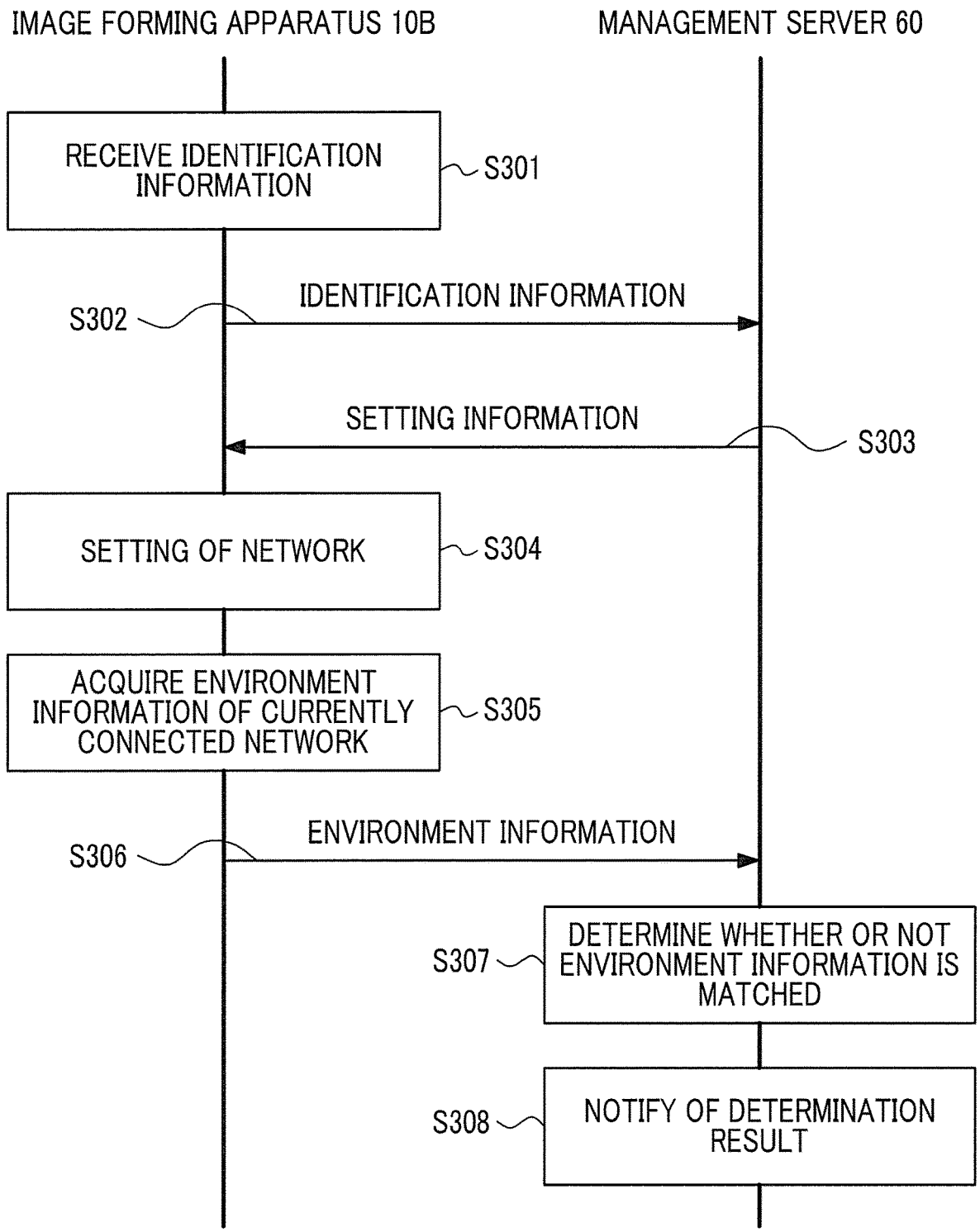
FIG. 11 is a sequence chart for explaining an operation immediately after the image forming apparatus 10A is replaced with the image forming apparatus 10B, in a case where the management server 60 performs the environment information matching determination.

Next, the operation immediately after the image forming apparatus 10A is replaced with the image forming apparatus 10B in a case where the environment information matching determination is performed on the management server 60 side as described above will be described with reference to the sequence chart of FIG. 11.

First, as shown in step S301, the image forming apparatus 10B receives identification information by user operation. Then, in step S302, the image forming apparatus 10B transmits the received identification information to the management server 60 through the LPWA communication network 50.

In step S3203, the management server 60 that has received the identification information from the image forming apparatus 10B transmits, to the image forming apparatus 10B, the setting information stored in association with the received identification information.

Thus, in step S304, the image forming apparatus 10B performs a setting of a network using the setting information received from the management server 60. Then, in step S305, the image forming apparatus 10B acquires environment information of the currently connected network. Then, in step S306, the image forming apparatus 10B transmits the environment information acquired in step S305 to the management server 60.

Then, in step S307, the management server 60 determines whether or not the environment information transmitted from the image forming apparatus 10B matches the environment information stored in the setting information and environment information storage unit 63.

Then, in step S307, the management server 60 notifies the user of the determination result.

Here, errors such as wrong information of an IP address to be set and wrong connection of a wiring to be connected may occur, as an error in the setting of the network.

Figure 12:
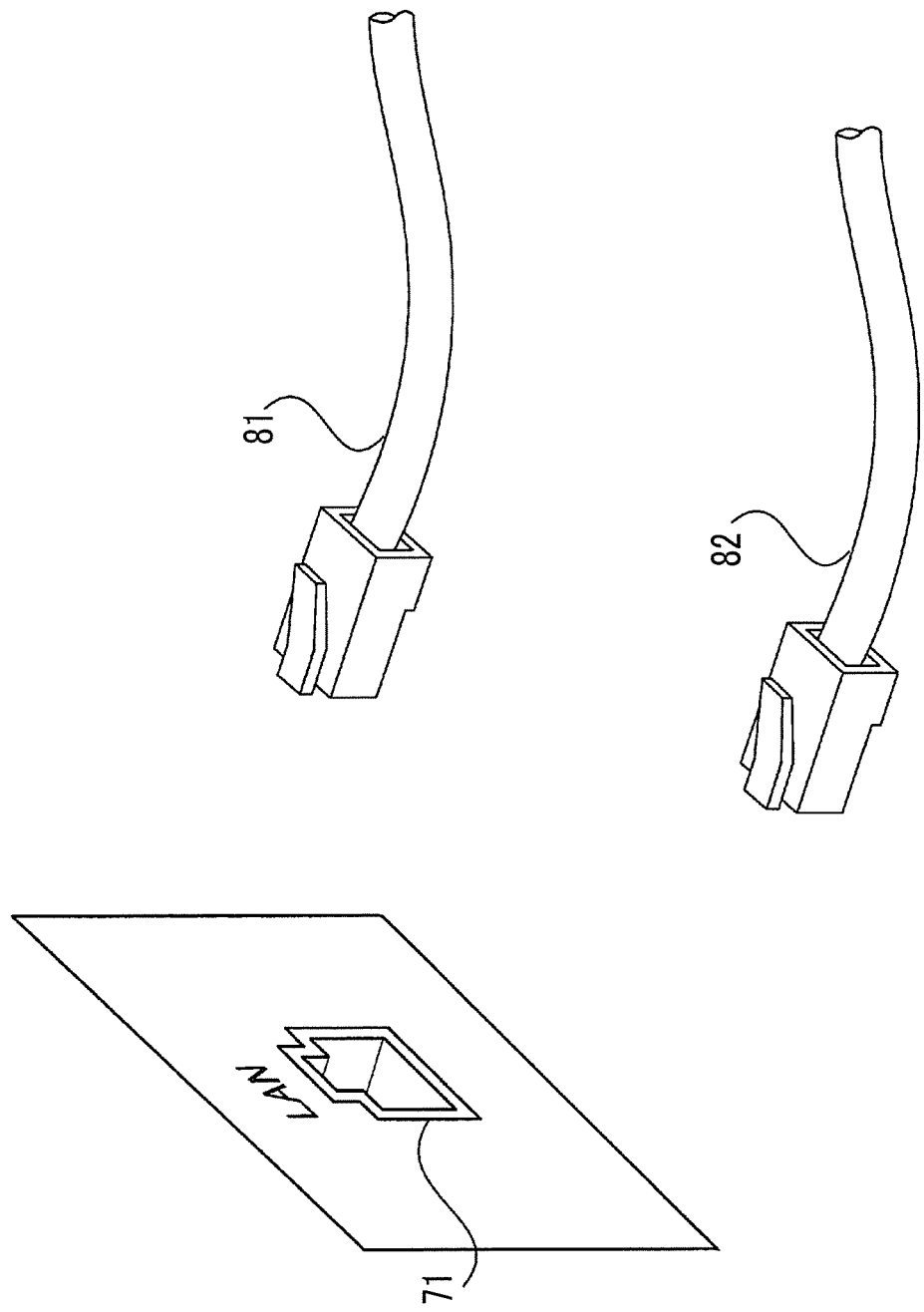
FIG. 12 is a diagram for explaining a state in which there are two wiring cables 81, 82 for one connection terminal 71.

For example, as shown in FIG. 12, in a case where there are two wiring cables 81, 82 around the connection terminal 71 of the local area network (LAN) of the image forming apparatus 10 in a case where the image forming apparatus 10 is replaced, there may be a case where miswiring occurs.

Figure 13B:
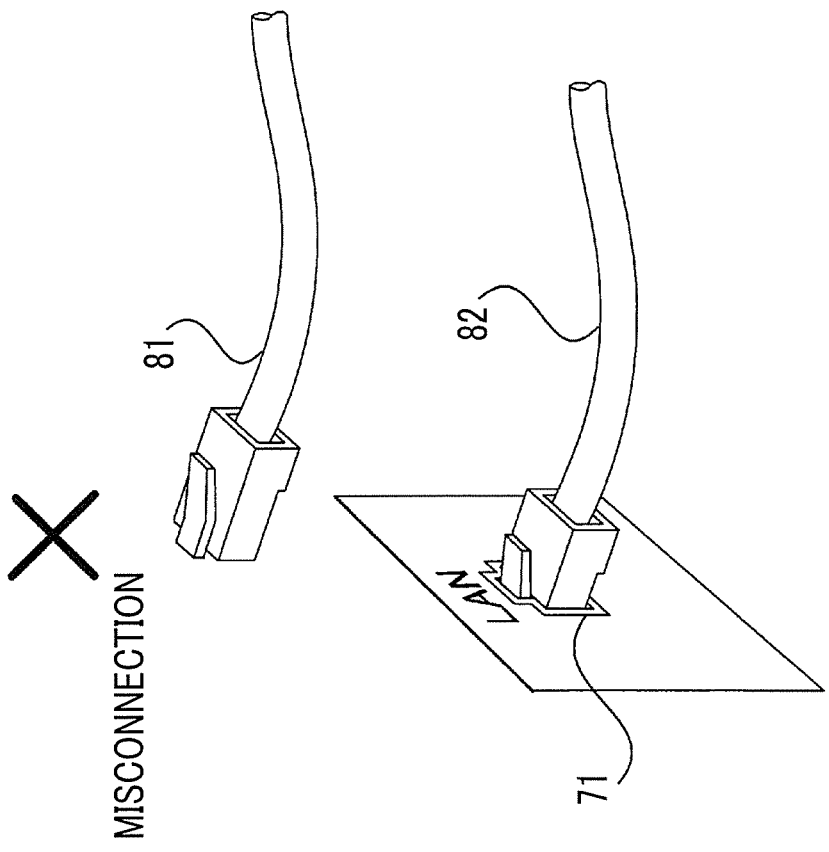
FIGS. 13A and 13B are diagrams for explaining a case of normal connection and a case of misconnection in the state as shown in FIG. 12.
Figure 13A:
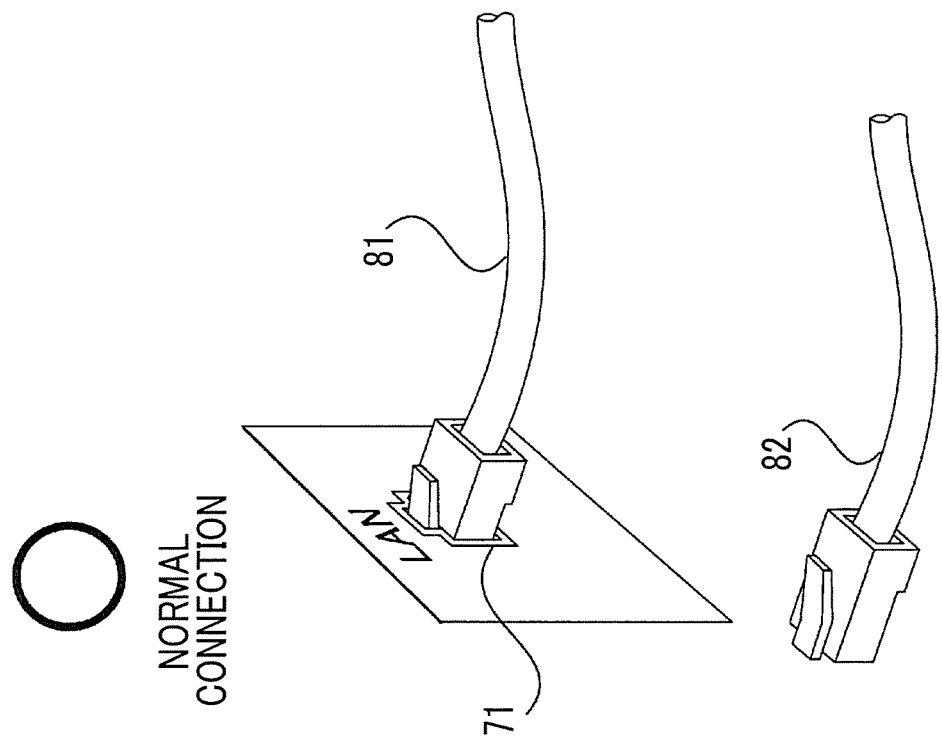

In this case, as shown in FIG. 13A, in a case where the wiring cable 81 is to be connected to the connection terminal 71, misconnection occurs in a case where the wiring cable 82 is connected by mistake as shown in FIG. 13B.

Figure 14:
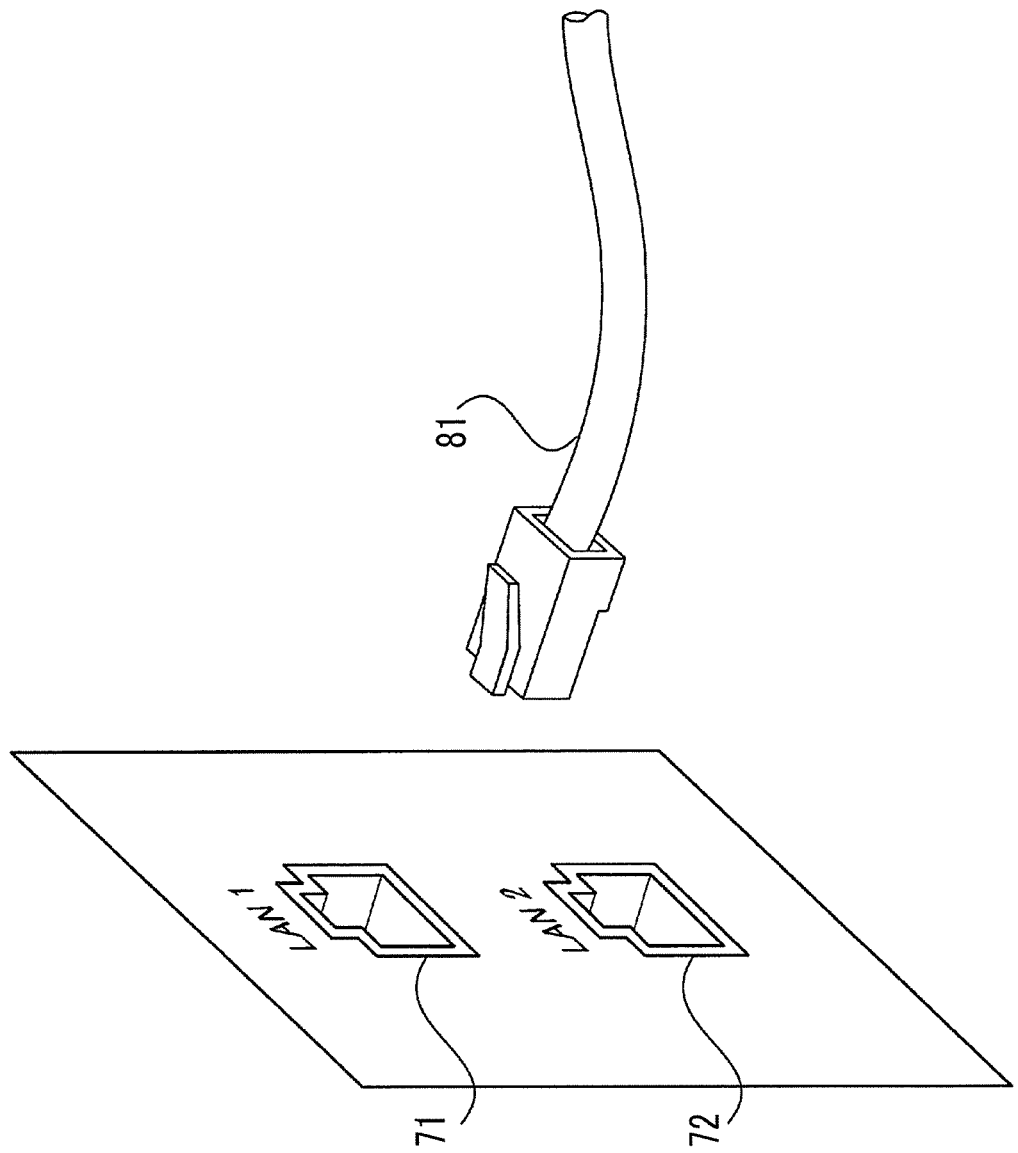
FIG. 14 is a diagram for explaining a state in which there is one wiring cable 81 for two connection terminals 71, 72.

For example, as shown in FIG. 14, in a case where there are two connection terminals 71, 72 in the LAN of the image forming apparatus 10 in a case where the image forming apparatus 10 is replaced, even in a case where only one wiring cable 81 is provided, there may be a case where miswiring occurs.

Figure 15B:
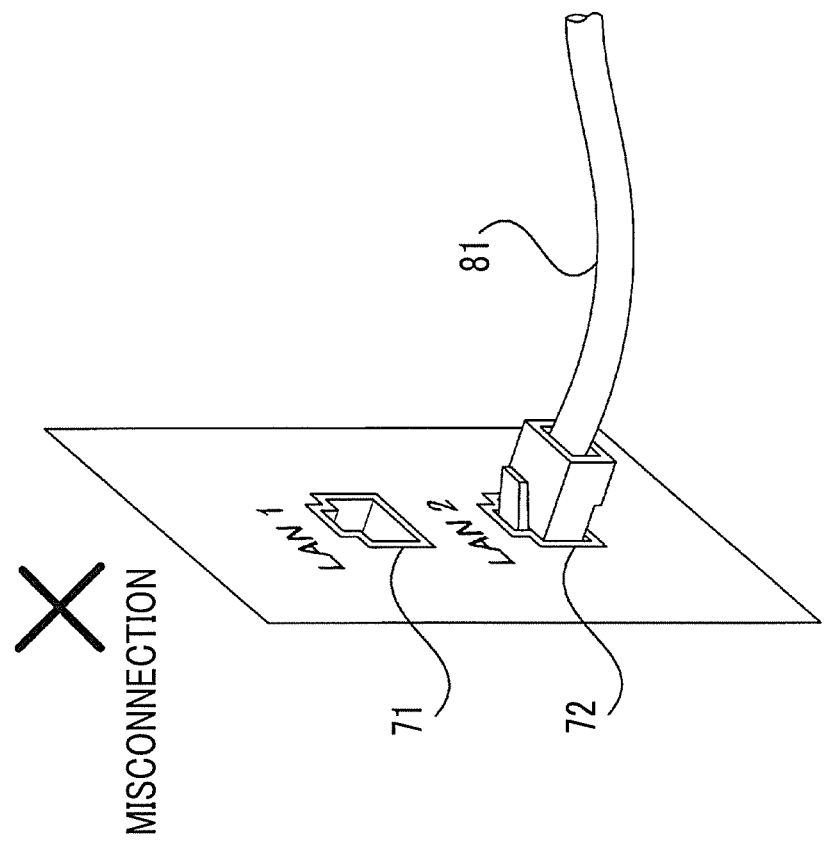
FIGS. 15A and 15B are diagrams for explaining a case of normal connection and a case of misconnection in the state as shown in FIG. 14.
Figure 15A:
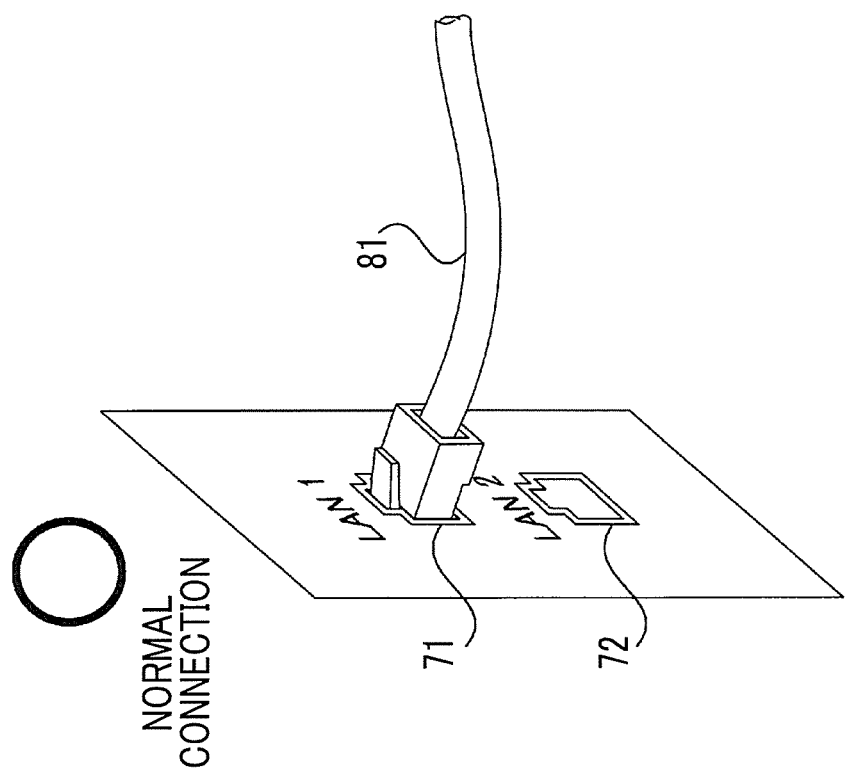

For example, as shown in FIG. 15A, in a case where the wiring cable 81 is to be connected to the connection terminal 71, misconnection occurs in a case where the wiring cable 81 is connected to the connection terminal 72 by mistake as shown in FIG. 15B.

Further, as shown in FIGS. 15A and 15B, in a case where there are plural network interface controllers (NICs), various misconnections may occur.

For example, as shown in FIG. 16, in a case where there are two connection terminals 71, 72 in the LAN of the image forming apparatus 10 and there are two wiring cables 81, 82 in a case where the image forming apparatus 10 is replaced, there may be a case where miswiring occurs, such as replacement of the wiring cables to be connected.

Figure 17A:
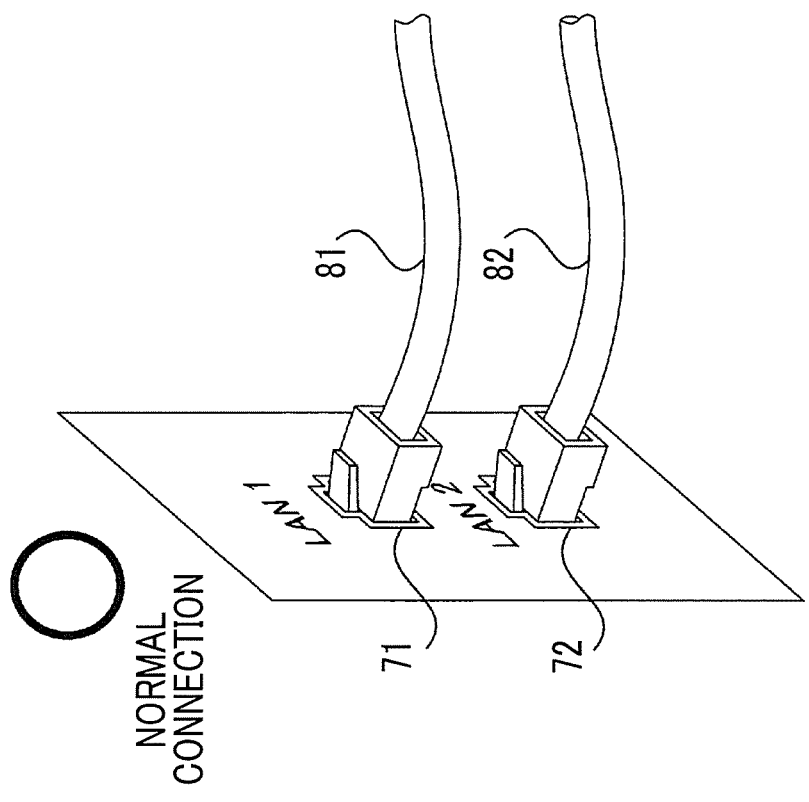
FIGS. 17A and 17B are diagrams for explaining a case of normal connection and a case of misconnection in the state as shown in FIG. 16.
Figure 17B:
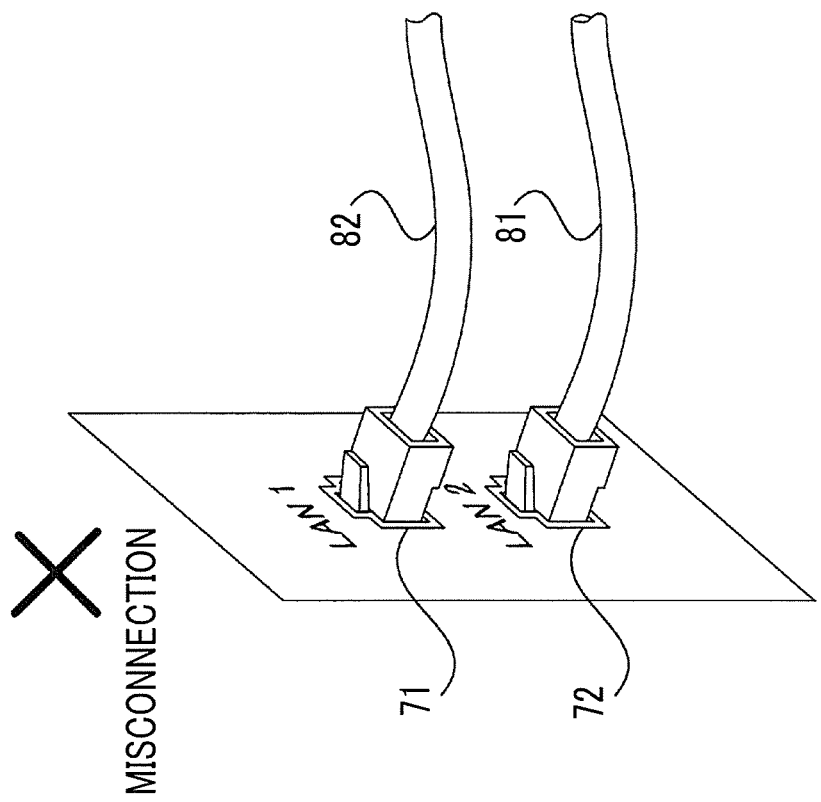

Specifically, as shown in FIG. 17A, in a case where the wiring cable 81 is to be connected to the connection terminal 71 and the wiring cable 82 is to be connected to the connection terminal 72, misconnection occurs in a case where the wiring cable 82 is connected to the connection terminal 71 and the wiring cable 81 is connected to the connection terminal 72 by mistake as shown in FIG. 17B.

Such misconnection is likely to occur in a case where the connection of the network is performed through a wired communication line such as a LAN cable.

Figure 18:
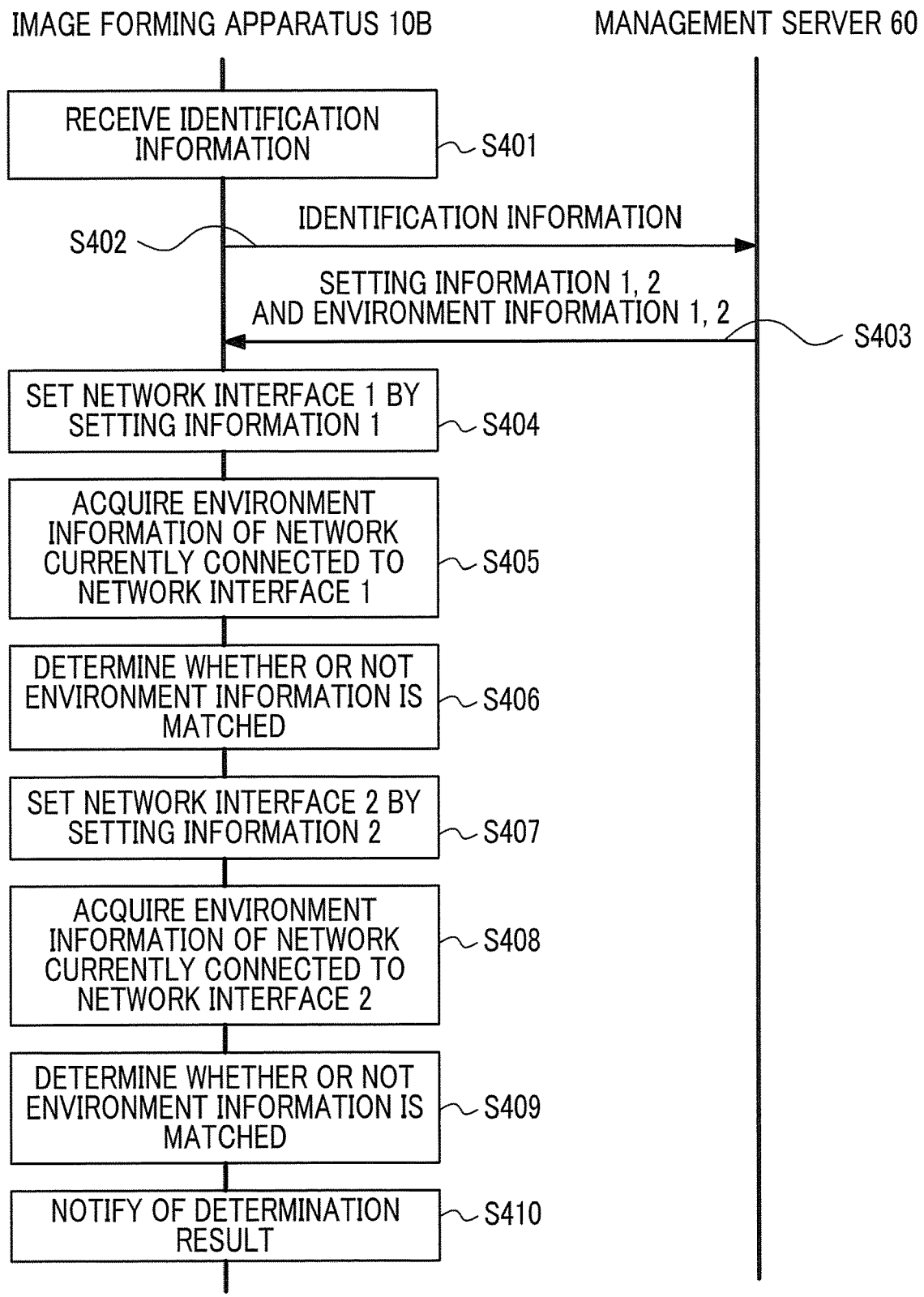
FIG. 18 is a sequence chart for explaining an operation immediately after the image forming apparatus 10A is replaced with the image forming apparatus 10B having two network interfaces.

The operation immediately after the image forming apparatus 10A is replaced with the image forming apparatus 10B having two NICs, that is, two network interfaces, will be described with reference to the sequence chart of FIG. 18.

First, as shown in step S401, the image forming apparatus 10B receives identification information by user operation. Then, in step S402, the image forming apparatus 10B transmits the received identification information to the management server 60 through the LPWA communication network 50.

In step S403, the management server 60 that has received the identification information from the image forming apparatus 10B transmits, to the image forming apparatus 10B, two pieces of setting information of setting information 1, 2 and two pieces of environment information of environment information 1, 2 stored in association with the received identification information.

Thus, in step S404, the image forming apparatus 10B performs a setting of a network of the network interface 1 using the setting information 1 received from the management server 60. Thus, in step S405, the image forming apparatus 10B acquires environment information of the network currently connected to the network interface 1. Then, in step S406, the image forming apparatus 10B determines whether or not the environment information acquired in step S405 matches the environment information 1 transmitted from the management server 60 in step S403.

Further, in step S407, the image forming apparatus 10B performs a setting of a network of the network interface 2 using the setting information 2 received from the management server 60. Thus, in step S408, the image forming apparatus 10B acquires environment information of the network currently connected to the network interface 2. Then, in step S409, the image forming apparatus 10B determines whether or not the environment information acquired in step S408 matches the environment information 2 transmitted from the management server 60 in step S403.

Then, in step S410, the image forming apparatus 10B notifies the user of the determination result.

As described above, in a case where the host apparatus is provided with plural network interfaces, the control unit 35 of the image forming apparatus 10B performs a setting of a network for each of the network interfaces. Then, the control unit 35 acquires network environment information for each network interface.

Then, in a case where the environment information to be acquired from one network interface is acquired from the other network interface, and the environment information to be acquired from the other network interface is acquired from one network interface, the control unit 35 informs that there is a possibility of misconnection in which the wirings to plural network interfaces are replaced.

Figure 19:
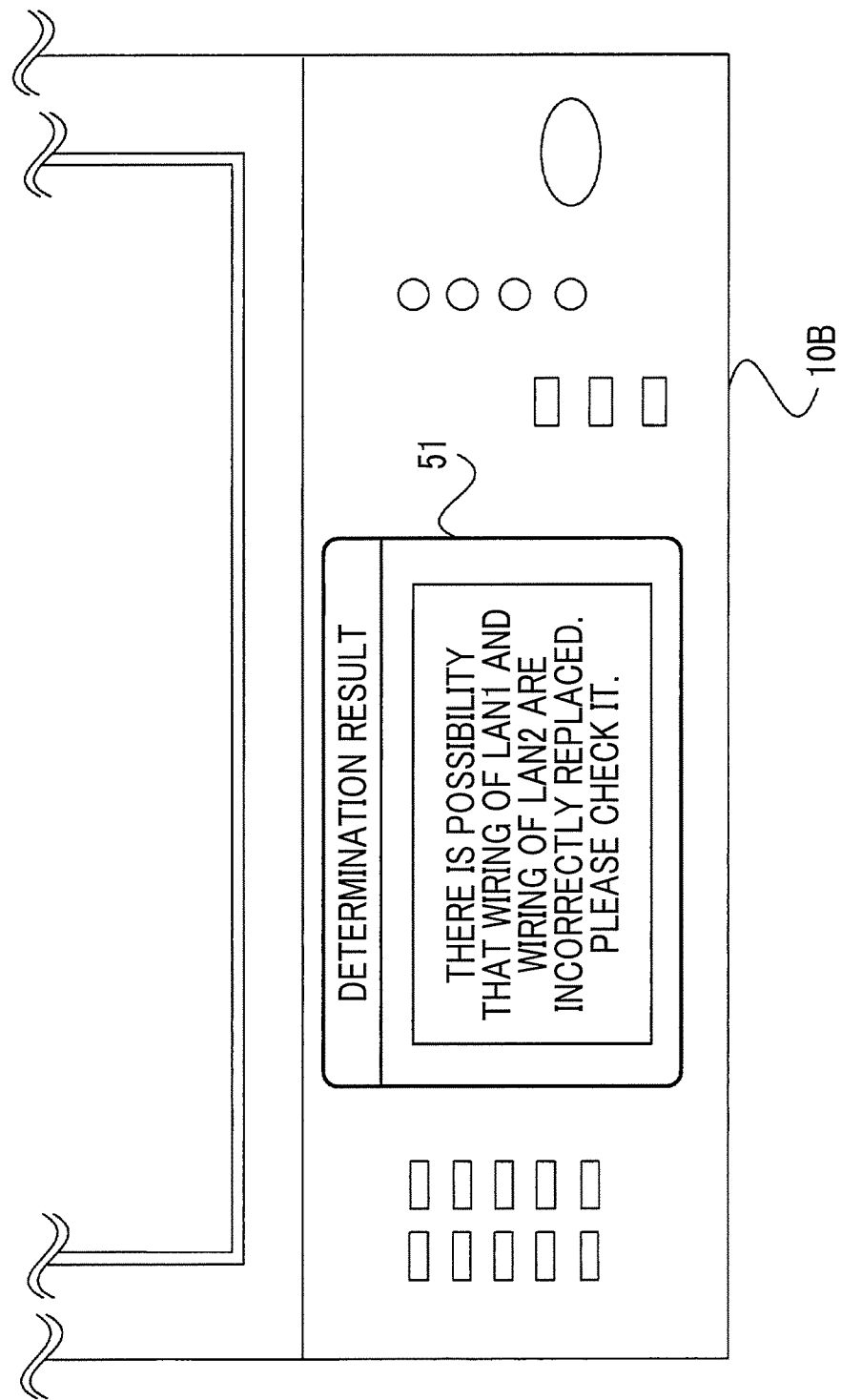
FIG. 19 is a diagram showing a notification example performed in the image forming apparatus 10 that has determined that there is a possibility of misconnection such as wiring replacement.

A notification example performed in the image forming apparatus 10 that has determined that there is a possibility of misconnection such as wiring replacement in this way is shown in FIG. 19.

In the notification example shown in FIG. 19, a message "There is a possibility that the wiring of LAN1 and the wiring of LAN2 are incorrectly replaced. Please check it." is displayed on the operation panel 51 of the image forming apparatus 10B, and the user is notified that there is a possibility that a misconnection such as a wiring replacement may be made.

[Modification Example]

The above exemplary embodiment has been described using the case where it is checked whether the setting of the network of the image forming apparatus after replacement is correctly performed in a case where the image forming apparatus is replaced, but the present invention is not limited to thereto, and the present invention can be applied similarly in a case where it is checked whether the setting of the network of the information processing apparatus after replacement is correctly performed in a case where an information processing apparatus other than the image forming apparatus is replaced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first acquisition unit that acquires setting information for performing a setting of a network of the apparatus, and first environment information of the network from an external management apparatus, through a communication line;
   a setting unit that performs the setting of the network using the setting information acquired by the first acquisition unit;
   a second acquisition unit that acquires second environment information of the network after execution of the setting by the setting unit; and
   a notification unit that notifies that the network to which the apparatus is connected is incorrect, in a case where the first environment information and the second environment information do not match.

2. The information processing apparatus according to claim 1,
wherein the first environment information is environment information of a case where a correct network setting is performed.

3. The information processing apparatus according to claim 1,
wherein the communication line is a wireless communication line in which communication with the management apparatus is performed without requiring a connection setting.

4. The information processing apparatus according to claim 2,
wherein the communication line is a wireless communication line in which communication with the management apparatus is performed without requiring a connection setting.

5. The information processing apparatus according to claim 3,
wherein the wireless communication line is a wireless communication line in a wide area wireless communication network in which data transmission and reception is performed at a lower communication speed than a communication speed in the network.

6. The information processing apparatus according to claim 4,
wherein the wireless communication line is a wireless communication line in a wide area wireless communication network in which data transmission and reception is performed at a lower communication speed than a communication speed in the network.

7. The information processing apparatus according to claim 1,
wherein in a case where a plurality of network interfaces are provided for the information processing apparatus, the setting unit performs a setting of a network for each of the network interfaces,
wherein the second acquisition unit acquires second environment information of the network for each of the network interfaces, and
wherein in a case where first environment information which is to be acquired from one network interface is acquired from another network interface, and second environment information which is to be acquired from the other network interface is acquired from the one network interface, the notification unit notifies that there is a possibility of misconnection where wirings for the plurality of network interfaces are replaced.

8. The information processing apparatus according to claim 7,
wherein connection of the network is performed through a wired communication line.

9. The information processing apparatus according to claim 1,
wherein the first acquisition unit acquires setting information and first environment information corresponding to the input identification information, and
wherein in a case where replacement of the apparatus is performed, the identification information is identification information identical to identification information which is input for the apparatus before replacement.

10. The information processing apparatus according to claim 2,
wherein the first acquisition unit acquires setting information and first environment information corresponding to the input identification information, and
wherein in a case where replacement of the apparatus is performed, the identification information is identification information identical to identification information which is input for the apparatus before replacement.

11. The information processing apparatus according to claim 3,
wherein the first acquisition unit acquires setting information and first environment information corresponding to the input identification information, and
wherein in a case where replacement of the apparatus is performed, the identification information is identification information identical to identification information which is input for the apparatus before replacement.

12. The information processing apparatus according to claim 4,
wherein the first acquisition unit acquires setting information and first environment information corresponding to the input identification information, and
wherein in a case where replacement of the apparatus is performed, the identification information is identification information identical to identification information which is input for the apparatus before replacement.

13. The information processing apparatus according to claim 5,
wherein the first acquisition unit acquires setting information and first environment information corresponding to the input identification information, and
wherein in a case where replacement of the apparatus is performed, the identification information is identification information identical to identification information which is input for the apparatus before replacement.

14. The information processing apparatus according to claim 6,
wherein the first acquisition unit acquires setting information and first environment information corresponding to the input identification information, and
wherein in a case where replacement of the apparatus is performed, the identification information is identification information identical to identification information which is input for the apparatus before replacement.

15. The information processing apparatus according to claim 7,
wherein the first acquisition unit acquires setting information and first environment information corresponding to the input identification information, and
wherein in a case where replacement of the apparatus is performed, the identification information is identification information identical to identification information which is input for the apparatus before replacement.

16. The information processing apparatus according to claim 8,
wherein the first acquisition unit acquires setting information and first environment information corresponding to the input identification information, and
wherein in a case where replacement of the apparatus is performed, the identification information is identification information identical to identification information which is input for the apparatus before replacement.

17. A non-transitory computer readable medium storing a program causing a computer to execute:
first acquiring setting information for performing a setting of a network of an apparatus, and first environment information of the network from an external management apparatus, through a communication line;
performing the setting of the network using the setting information acquired in the first acquiring;

second acquiring second environment information of e
network after execution of the setting in the setting; and
notifying that the network to which the apparatus is connected is incorrect, in a case where the first environment information and the second environment information do not match.

18. An information processing apparatus comprising a processor for:
first acquiring setting information for performing a setting of a network of the apparatus, and first environment information of the network from an external management apparatus, through a communication line;
performing the setting of the network using the setting information acquired in the first acquiring;
second acquiring second environment information of the network after execution of the setting in the setting; and
notifying that the network to which the apparatus is connected is incorrect, in a case where the first environment information and the second environment information do not match.

* * * * *